March 6, 1962 E. J. KRACK 3,024,408
AUTOMATIC GAIN CONTROL CIRCUIT
Filed April 9, 1959 2 Sheets-Sheet 1
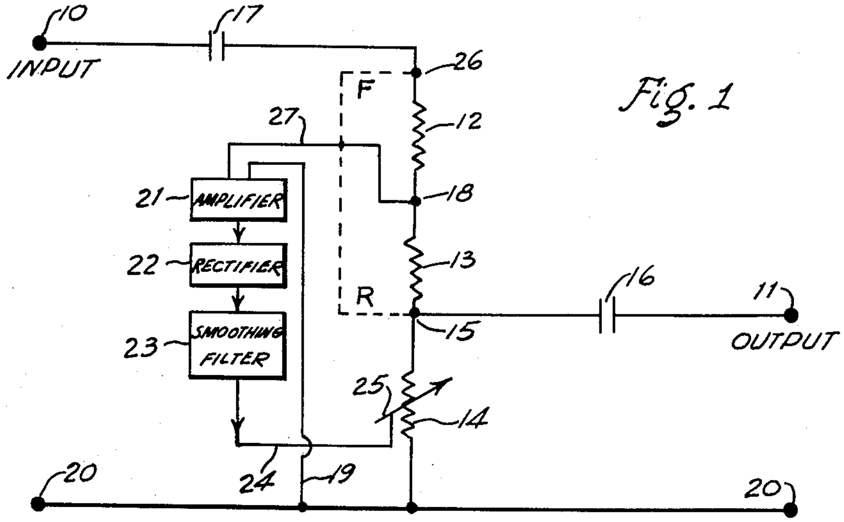
Fig. 1
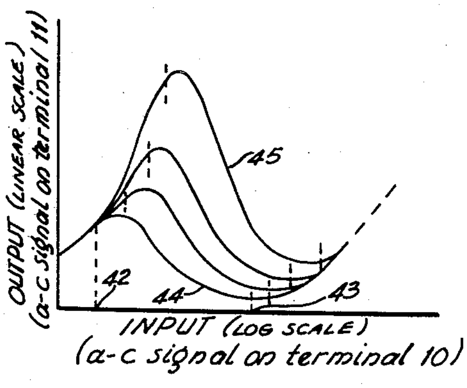
Fig. 2 (PRIOR ART F)
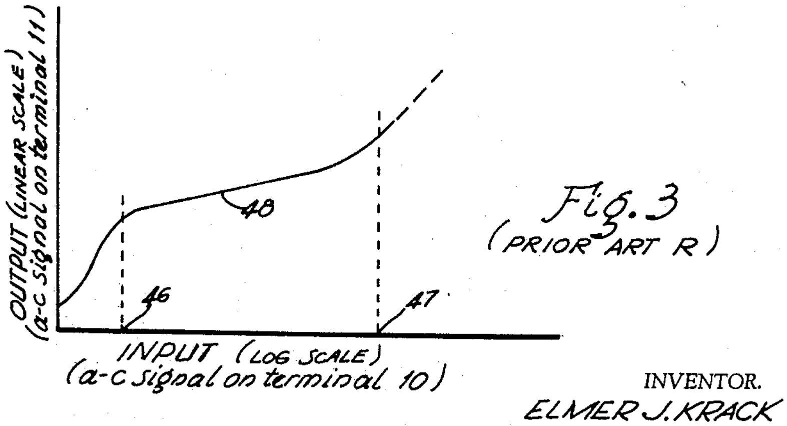
Fig. 3 (PRIOR ART R)
INVENTOR.
ELMER J. KRACK
BY March 6, 1962 E. J. KRACK 3,024,408

AUTOMATIC GAIN CONTROL CIRCUIT

Filed April 9, 1959 2 Sheets-Sheet 2

INVENTOR.
ELMER J. KRACK

BY 3,024,408

AUTOMATIC GAIN CONTROL CIRCUIT

Elmer J. Krack, Penn Hills Township, Allegheny County, Pa., assignor to Gulf Research & Development Company, Pittsburgh, Pa., a corporation of Delaware Filed Apr. 9, 1959, Ser. No. 805,323
6 Claims. (Cl. 323—66)

This invention relates to an automatic gain control (AGC) circuit for audio amplifiers, and in particular pertains to an AGC circuit that is advantageous for use in an amplifier employed in seismic prospecting by the so-called reflection shooting method.

It is common practice to employ AGC (also sometimes called AVC) in seismic prospecting amplifiers and many such circuits are known. The known AGC circuits may be classified in two main types, namely forward acting, in which the signal is sampled and the sample used to control only the input to a succeeding amplifier stage; and reverse acting, in which the signal is sampled and the sample used to control the signal at the sampling point as well as succeeding stages of the amplifier. Both of these types have certain desirable characteristics, and attempts have been made to combine both in a single amplifier. However, such combination forward and reverse acting AGC systems that have heretofore been used are complex (see for example U.S. Patents Nos. 2,329,558 and S.N. 546,705 filed 11/14/55, now Patent No. 2,905,772) in that they generally require two separate AGC channels which increases the space, weight and power requirements of the amplifying system.

The present invention provides an AGC circuit that is simple, requires but a single control channel, and has the desirable characteristics of both forward and reverse acting types of AGC. Furthermore the relative amounts of forward acting control and reverse acting control is adjustable and may be easily varied to suit any particular energy sequence (with respect to time) in the seismic signal. The present invention has the further practical advantage that it does not require a non-linear amplifier and thus avoids the variations and undesirable characteristics and distortions accompanying non-linear amplifiers.

The circuit of this invention will be described with reference to the accompanying drawings forming a part of this specification, and in which FIGURE 1 is a functional block diagram of the circuit of this invention;

FIGURE 2 is a graph illustrating the characteristics of a typical forward-acting AGC as used in the prior art;

FIGURE 3 is a graph illustrating the characteristics of a typical reverse-acting AGC as used in the prior art;

Figure 5:
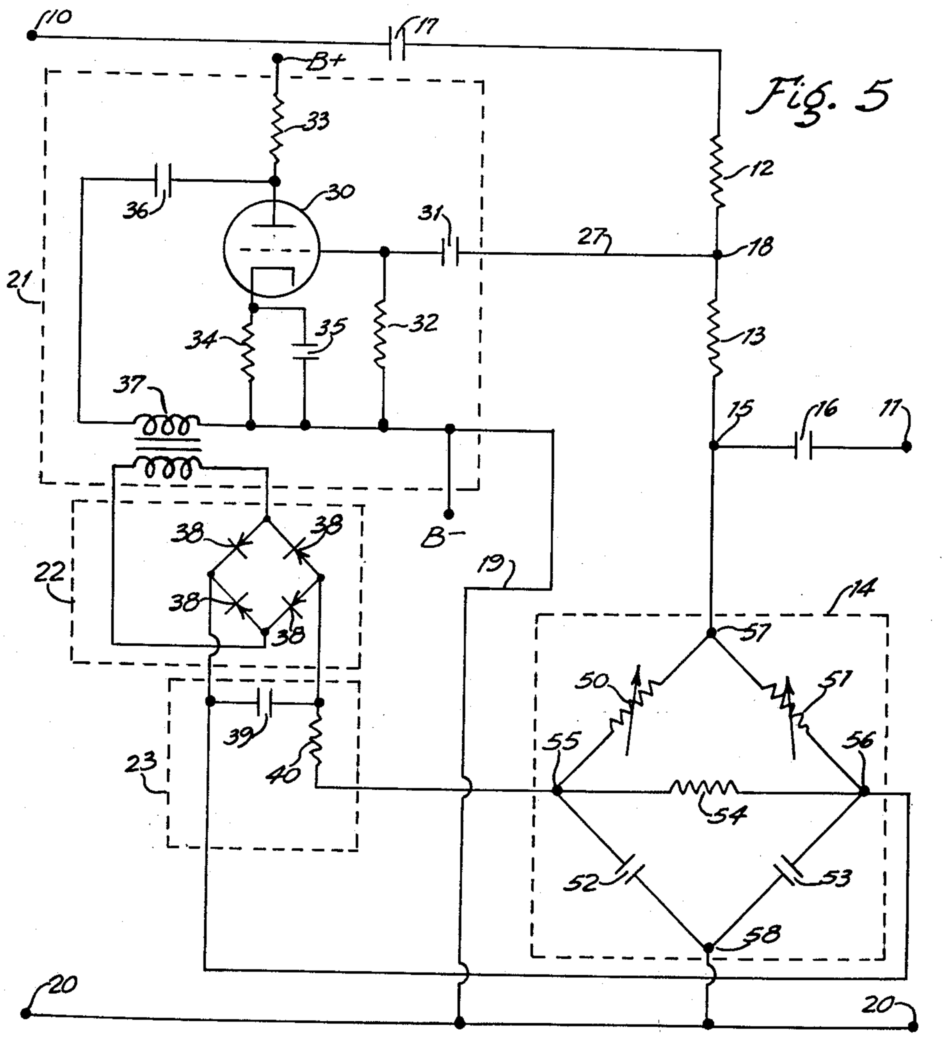
FIGURE 5 is a schematic wiring diagram of an embodiment of the circuit of this invention.

FIGURE 1 shows a functional block diagram of that portion of an audio amplifier channel which includes the AGC circuits of this invention. The signal from the preceding stage of the amplifier is applied to an input terminal 10, and after traversing the AGC network to be described the signal is delivered to an output terminal 11, whence it goes to the next succeeding stage of the amplifier. The circuit between the terminals 10 and 11 comprises a voltage divider network including fixed impedances 12 and 13, and a controllable impedance generally indicated by 14, all connected in series as shown. The impedances 12 and 13 may be resistances as shown and controlled impedance 14, to be described in detail later, may also be predominantly resistive. The three impedances 12, 13, and 14 are connected in series between terminal 10 and a common terminal 20. For purposes of this invention the common terminal 20 is the terminal generally termed the signal ground, through it is to be understood that the terminal 20 need not necessarily be at ground D.-C. potential.

From the junction point 15 between resistors 13 and 14, a coupling condenser 16 transmits the signal to the output terminal 11. The capacitance of coupling condenser 16 is sufficiently high so that at the frequencies of interest its impedance is negligible as compared with the impedance of the resistor 14 to which it is connected. A similar coupling condenser 17 is connected between terminal 10 and resistor 12, the capacitance of condenser 17 being sufficiently high so that at the frequencies of interest its impedance is negligible compared with the impedance of the voltage divider to which it is connected. The function of condensers 16 and 17 is merely to electrically isolate terminals 10 and 11 from D.-C. voltages in other parts of the preceding and succeeding amplifier stages.

A control voltage is derived from the junction point 18 of resistors 12 and 13 by means of amplifier 21, full-wave rectifier 22, and smoothing filter 23. The elements 21, 22, and 23 are known and an example of each will be described in detail later. The output of filter 23 is a D.-C. voltage which over the operating range of the system is substantially proportional to the signal strength (A.-C.) at point 18, and this D.-C. voltage is applied to the controllable impedance 14 to vary the effective resistance of the latter in known manner as will be described in detail later. The control of impedance 14 is functionally indicated in FIGURE 1 by the connection 24 to the arrow 25 representing the control of impedance 14. The input of amplifier 21 returns to the common terminal 20 as indicated by lead 19.

In order to explain operation of the AGC of this invention, the operation of two modifications of FIGURE 1 will first be discussed. These will produce respectively a purely forward-acting AGC and a purely reverse-acting AGC. In these discussions it will be assumed that the impedance of the source connected to the input terminal is relatively low compared to the impedance of elements 12, 13, and 14 in series, so that variations in the latter produce substantially no change in loading of the source supplying signal to terminal 10.

First, let it be assumed that the lead 27 is removed from terminal 18 and instead is connected to the terminal 26 as indicated by F in FIGURE 1. It is apparent that this is equivalent to connecting the lead 27 to the input terminal 10. This results in a purely forward-acting AGC, i.e. the control does not affect the signal sampled by the lead 27 but effects only the output of the circuit at junction 15, i.e. terminal 11. The voltage divider effecting the transfer of voltage from input terminal 10 to output terminal 11 now comprises only two impedances, i.e. 12 and 13 taken together and controllable impedance 14. Such a purely forward-acting AGC circuit will have a steady-state amplitude response curve such as is illustrated by one of the family of curves shown in FIGURE 2. The AGC takes effect at an input signal represented by the abscissa 42 and is effective up to an input signal represented by the abscissa 43. Inasmuch as the signal on lead 27 is independent of the output, it is apparent that a very high degree of AGC may be obtained as illustrated for example by curve 44. Curve 44 shows the AGC to be ineffective at very low input signals (i.e. less than that represented by abscissa 42), achieves a high degree of control in the operating range, and at very high input signals (i.e. greater than that represented by abscissa 43) the limit of the control circuit is exceeded and the control is no longer effective, the latter condition being represented by the tail (dotted) end of the curve. It is seen that the curve 44 has a very pronounced dip in the operating range, so that over the major portion of the operating range there is actually a decrease of output for an increase of input.

It would appear that by judiciously choosing the gain of amplifier 21 as well as other parameters of such a purely forward-acting AGC circuit, one might attempt to obtain a flat control characteristic. However, it is found that a reduction in the gain of amplifier 21 merely raises the amplitude of the A.C. input signal at which the control becomes effective. FIGURE 2 illustrates this effect, the family of curves from 44 to 45 being taken with successively less gain in amplifier 21. It is observed that the dip remains in each curve and this is characteristic of such a purely forward-acting AGC. Such a dip in characteristic is obviously undesirable because it gives a decrease in output for an increase in input and vice versa, which in seismic operation gives rise to spurious indications that may be erroneously mistaken for seismic reflections. Attempts have been made in the prior art forward-acting AGC circuits to overcome the dip in the characteristic curve by introducing non-linear elements at various points of the circuit, e.g. in the amplifier 21. However, the use of non-linear elements is highly undesirable because of the transients and distortions introduced by them and also because commercially obtainable units are so highly non-uniform that is is impossible or highly expensive to attempt to make two channels alike as is required for multi-channel seismograph prospecting apparatus.

Second, let it be assumed that the lead 27 is connected to the terminal 15 as indicated by R in FIGURE 1. It is apparent that this is equivalent to connecting the lead 27 to the output terminal 11. This results in a purely reverse-acting AGC, i.e. the control affects the signal sampled by the lead 27 as well as the signal delivered to terminal 11. The voltage divider effecting the transfer of voltage to output terminal 11 again comprises only two impedances, i.e. 12 and 13 taken together and controllable impedance 14. Such a purely reverse-acting AGC circuit will have a steady-state amplitude response curve illustrated by the curve of FIGURE 3. In the effective range of the control circuit, i.e. between the input signal levels 46 and 47, the AGC may be made to keep the output from increasing rapidly, but even with a high degree of gain in amplifier 21 the circuit must always give some increase in output when the input increases, as represented by the curve portion 48. Such a purely reverse-acting AGC has a wide operating range, as represented by the wide range between abscissae 46 and 47, but it is found that when one attempts to attain a high degree of control as by increasing the gain of amplifier 21 the circuit becomes unstable with resulting oscillation, motorboating, etc.

From the preceding discussion it is apparent that a purely forward-acting AGC suffers from a dip in the characteristic curve, and a purely reverse-acting AGC suffers from lack of a high degree of control and/or instability. By way of advantages, however, the purely forward-acting AGC is stable and the purely reverse-acting AGC has a wide operating range. This invention combines these desirable features in a single combination control as will now be described.

Figure 4:
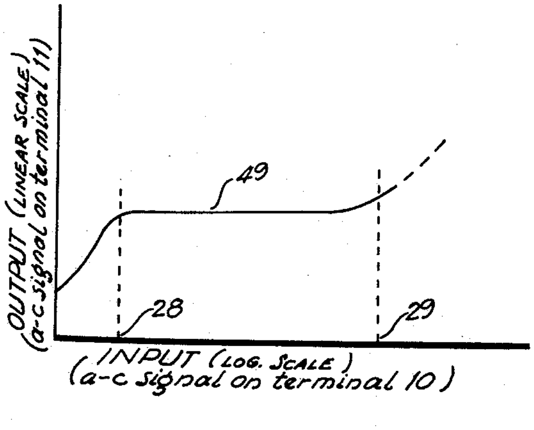
FIGURE 4 is a graph illustrating the characteristics of a combination forward-acting and reverse-acting AGC as provided by this invention.

In the circuit of this invention the lead 27 is connected to point 18 as shown by the solid line 27 in FIGURE 1, and the resistors 12 and 13 both have finite values. By judiciously adjusting the relative resistances of resistors 12 and 13, together with the controlling effect of the voltage divider comprising the sum of resistors 12 and 13 as compared with the resistance variations attainable in the controllable resistor 14, it is possible to obtain a response curve such as is illustrated in FIGURE 4. The steady-state response, as represented by the curve 49, may be made substantially flat in the operating range between input levels represented by abscissae 28 and 29, i.e. the steady-state output remains substantially constant for all values of input within the operating range. As shown in FIGURE 4, the operating range of the AGC circuit of this invention is very large being substantially as large as that of a purely reverse-acting AGC. Furthermore, amplifier 21 may be a simple linear amplifier and need have but moderate gain so that the circuit is stable. The rise of the response curve that is characteristic of the purely reverse-acting AGC is overcome by the introduction into the circuit of a small but important amount of forward-acting AGC effect.

FIGURE 5 shows a schematic wiring diagram of an embodiment of this invention. The elements 10 to 27 inclusive are the same as like-numbered elements referred to in the description of FIGURE 1. Amplifier 21, rectifier 22, filter 23, and controllable impedance 14 are the elements in the dotted outlines so numbered in FIGURE 5.

The amplifier 21 comprises vacuum tube 30 which for example may be a triode as shown, but other equivalent types of amplifier tubes may alternatively be used in well-known manner. The input to amplifier 21 is taken from junction point 18 by lead 27, and return of the input is by a lead 19 to the common terminal 20. A coupling condenser 31 transmits the input signal to the grid of tube 30, and a grid resistor 32 is connected from the grid to common terminal 20. The anode of tube 30 is connected to the plate-supply voltage (B+) through plate resistor 33. The cathode of tube 30 is connected to the common terminal 20 through a conventional cathode resistor 34 with associated by-pass condenser 35. The signal appearing at the plate of tube 30 is coupled by means of condenser 36 to the primary winding of output transformer 37 as shown. The plate supply of tube 30 returns to the common terminal 20 as indicated (B—). Condensers 31, 35, and 36 each have a sufficiently high capacitance so that at the frequencies of interest their respective impedances are negligible compared to the circuits to which they are connected. The output of transformer 37 is delivered from its secondary winding to the rectifier 22. The amplifier 21 is substantially linear over the operating range.

Rectifier 22 comprises a conventional bridge-type full-wave rectifier comprising four similar diodes 38 connected as indicated in FIGURE 5. The D.-C. output of rectifier 22 is filtered by smoothing filter 23 which comprises condenser 39 and resistor 40. The filtered D.-C. is then employed to control the controllable impedance 14.

Controllable impedance 14 comprises four impedance elements connected in a balanced impedance bridge circuit as shown in FIGURE 5. Impedances 50 and 51 are similar non-linear voltage-sensitive resistors connected in adjacent arms of the bridge, and their junction point 57 is connected to terminal 15. Suitable voltage-sensitive resistors which may be employed as elements 50 and 51 are commercially available under a variety of trade names, e.g. "Varistor" made by International Resistance Company, "Thyrite" made by General Electric Company, and "Globar" made by Carborundum Company. These devices have a large negative resistance-voltage coefficient so that when the voltage applied to the terminals of the device increases, its resistance decreases. Alternatively, the voltage-sensitive resistors 50 and 51 may be biased diodes of either vacuum-tube type or crystal type, the bias in each case being in a direction to oppose the control current from filter 23. It is preferred to use silicon diodes operating on the well-known Zener characteristics for elements 50 and 51.

In the controllable impedance bridge 14 (FIGURE 5) the control voltage from the filter 23 is applied to resistors 50 and 51 in series and as the control voltage increases, the resistance between terminals 55 and 56 decreases. The other two arms of the bridge that are connected to terminals 55 and 56 have similar condensers 52 and 53 which are of sufficiently high capacitance so that their impedance at the frequencies of interest is low compared to the resistance of elements 50 and 51. The junction 58 of condensers 52 and 53 is connected to the common terminal 20. The elements 50, 51, 52, and 53 have values such that the bridge 14 is balanced at all times for A.-C. signal applied between terminals 57 and 58. A resistor 54 is connected between the points 55 and 56 and serves to provide an upper limit to the resistance between points 55 and 56 in order that the condensers 52 and 53 may discharge within a reasonable time subsequent to AGC action. It is apparent that the operation of bridge 14 is such that when D.-C. voltage is applied to terminals 55 and 56, the A.-C. impedance between points 57 and 58 decreases, whereupon the A.-C. signal transmitted from terminal 10 to terminal 11 also decreases.

The bridge 14 containing voltage-sensitive resistors 50 and 51 introduces no observable distortion into the A.-C. signal because the A.-C. signal applied to the bridge is usually relatively small so that as far as the A.-C. swing is concerned the resistors 50 and 51 are practically constant. The much higher D.-C. control voltage from the amplifier-rectifier-filter is of sufficiently high voltage to effect a change in the resistance of the voltage-sensitive resistors 50 and 51. Also since the bridge is balanced, any ripple remaining in the D.-C. control voltage from filter 23 and applied to terminals 55 and 56 of the bridge will not appear at points 57 and 58 and hence will not be fed back into the signal channel or into amplifier 21.

It is apparent that the time constant of the smoothing filter 23 is determined largely by the capacitance of condenser 39 and the combined resistance of resistor 40 and controllable resistor 14. In seismograph prospecting operations this time constant is known to be an important parameter of the circuit, and it is conveniently adjusted by varying either the condenser 39 or resistor 40 or both in well-known manner.

Operation of the circuit from lead 27 to the output of filter 23 is conventional and will be understood by those skilled in the art. Operation of the controllable impedance 14 has been described above. Thus an increase in signal at lead 27 results in an increase in D.-C. control voltage across the control terminals 55 and 56 of unit 14, with a resulting decrease in the impedance of unit 14 between terminals 57 and 58. The resulting lowering of A.-C. impedance from terminal 15 to the common terminal 20 will result in a smaller fraction of the input signal from terminal 10 arriving at the output terminal 11.

FIGURE 4 shows the steady-state output response characteristic of a typical embodiment of this invention as illustrated in FIGURE 5. The degree of forward-acting AGC and reverse-acting AGC have been judiciously adjusted to produce a substantially constant output for all input amplitudes over the effective signal range. In the circuit of this invention the resistance of resistor 12 is substantially larger than that of resistor 13 when amplifier 21 has moderate gain, so that the degree of forward-acting AGC employed is relatively small but is nevertheless important in preventing a rise in the characteristic curve between abscissae 28 and 29 as would occur in a purely reverse-acting AGC. The AGC whose characteristic curve is shown in FIGURE 4 has an effective range from a signal represented by abscissa 28 to that represented by abscissa 29. Between these points the characteristic curve 49 is substantially flat, i.e. the output is substantially independent of input. There is no dip in the curve such as would be produced by a purely forward-acting AGC. The operating range is substantially the same as that obtained in a purely reverse-acting AGC. Accordingly the AGC circuit of this invention results in a substantially constant output for a greater range of input signals than has hitherto been attainable, and the use of non-linear amplifiers is eliminated.

By way of example, a steady-state amplitude response curve like that of FIGURE 4 in which a substantially constant output over a 26 db range of input is obtained when the circuit of this invention is used as a transmission element between commonly-used amplifying tubes and the elements in FIGURE 5 have values shown in the following table:

| Element No. | Component | Specification |
|---|---|---|
| 12 | Resistor | 25,000 ohm. |
| 13 | do | 900 ohm. |
| 16 | Condenser | 0.5 mfd. |
| 17 | do | 0.5 mfd. |
| 30 | Vacuum tube | Type 5719. |
| 31 | Condenser | 0.1 mfd. |
| 32 | Resistor | 1.5 megohm. |
| 33 | do | 330,000 ohm. |
| 34 | do | 3,400 ohm. |
| 35 | Condenser | 30 mfd. |
| 36 | do | 0.33 mfd. |
| 37 | Transformer | 90,000 ohm—10,000 ohm (e.g. S.I.E. Co. RA-1767). |
| 38 | Rectifier | Type 1N100 (e.g. Hughes). |
| 39 | Condenser | 10 mfd. |
| 40 | Resistor | 2,400 ohm. |
| 50 | Voltage-sensitive resistor. | Type 650Co silicon diode. |
| 51 | do | Type 650Co silicon diode (e.g. "Texas" instruments). |
| 52 | Condenser | 20 mfd. |
| 53 | do | 20 mfd. |
| 54 | Resistor | 22,000 ohm. |
| B+ | Plate supply | 300 volts. |

It is apparent that for purposes of adjustment and for testing the AGC circuit of this invention, resistors 12 and 13 may be combined into a potentiometer (not shown) whose slider is connected to the lead 27. The effective position of terminal 18 can thereby easily be varied until the desired flat response curve is obtained, and thereafter the resistors 12 and 13 may be substituted for the two respective arms of the potentiometer. It is further apparent that if it is desired to change the slope of the response curve to something other than perfectly flat for special applications, this may be done by changing the adjustment of such a potentiometer, i.e. by changing the ratio of resistors 12 and 13. It is further apparent that while elements 12, 13, and 14 have for purposes of illustration been described as resistors, they may be replaced by appropriate impedances of other type if such is desirable for special applications of the invention.

What I claim as my invention is:

1. A signal transmission circuit comprising an input terminal, an output terminal, and a common signal-return connection, a voltage divider circuit comprising a first impedance and a second impedance and a third impedance connected in series in the order named from said input terminal to said signal-return connection, the impedance value of said first impedance being many times greater than the impedance value of said second impedance, means connecting said output terminal to the junction of said second impedance and said third impedance, an amplifier connected to and receiving signal from the junction of said first impedance and said second impedance, a rectifier connected to and receiving signal from said amplifier, a smoothing filter connected to and receiving rectified signal from said rectifier, said third impedance comprising at least one controllable impedance element having control terminals, and means transmitting the output of said smoothing filter to said control terminals.

2. A signal transmission circuit comprising an input terminal, an output terminal, and a common signal-return connection, a voltage divider circuit comprising a first resistor and a second resistor and a third impedance connected in series in the order named from said input terminal to said signal-return connection, the impedance value of said first impedance being many times greater than the impedance value of said second impedance, means connecting said output terminal to the junction of said second resistor and said third impedance, an amplifier connected to and receiving signal from the junction of said first resistor and said second resistor, a rectifier connected to and receiving signal from said amplifier, a smoothing filter connected to and receiving rectified signal from said rectifier, said third impedance comprising at least one controllable impedance element having control terminals, and means transmitting the output of said smoothing filter to said control terminals.

3. A signal transmission circuit comprising an input terminal, an output terminal, and a common signal-return connection, a voltage divider circuit comprising a first resistor and a second resistor and a third impedance connected in series in the order named from said input terminal to said signal-return connection, the impedance value of said first impedance being many times greater than the impedance value of said second impedance, means connecting said output terminal to the junction of said second resistor and said third impedance, a substantially linear amplifier connected to and receiving signal from the junction of said first resistor and said second resistor, a rectifier connected to and receiving signal from said amplifier, a smoothing filter connected to and receiving rectified signal from said rectifier, said third impedance comprising at least one voltage-sensitive resistor connected to control terminals, and means transmitting the output of said smoothing filter to said control terminals.

4. A signal transmission circuit comprising an input terminal, an output terminal, and a common signal-return connection, a voltage divider circuit comprising a first resistor and a second resistor and a third impedance connected in series in the order named from said input terminal to said signal-return connection, the impedance value of said first impedance being many times greater than the impedance value of said second impedance, means connecting said output terminal to the junction of said second resistor and said third impedance, a substantially linear amplifier connected to and receiving signal from the junction of said first resistor and said second resistor, a rectifier connected to and receiving signal from said amplifier, a smoothing filter connected to and receiving rectified signalf rom said rectifier, said third impedance comprising a first diagonal of a balanced impedance bridge having a pair of voltage-sensitive resistors in adjacent arms thereof and connected to a second diagonal, and means transmitting the output of said smoothing filter to said second diagonal of said bridge.

5. An AGC system comprising a source of signal to be amplified with signal-controlled gain, an amplifier having an input and an output connection, a voltage divider network comprising a first resistor and a second resistor and a third impedance connected in series in the order named, the impedance value of said first impedance being many times greater than the impedance value of said second impedance, said third impedance comprising a variable impedance having control terminals, means connecting the signal source across said voltage-divider network, means connecting the input connection of said amplifier to the junction of said first and second resistors, signal rectifying means connected to the output connection of said amplifier, and means connecting the output of said rectifying means to the control terminals of said variable impedance.

6. A signal transmission circuit having input and output terminals and delivering substantially constant A.-C. output signal amplitude for a wide range of A.-C. input signal amplitudes comprising a first resistor and a second resistor and a third impedance connected in series in the order named across the input terminals, the impedance value of said first impedance being many times greater than the impedance value of said second impedance, said third impedance comprising at least one controllable voltage-sensitive resistance element and having a pair of control terminals, said third impedance being adapted to present a lower impedance in said series connection when D.-C. is supplied to said control terminals, means connecting said output terminals to the junction of said second resistance and said third impedance, an amplifier having input and output terminals, means connecting said amplifier input terminals respectively to the junction of said first resistor and second resistor and to the remote input terminal, rectifier means having A.-C. input terminals and D.-C. output terminals, means connecting said A.-C. input terminals of said rectifier means to the output terminals of said amplifier, filter means, means connecting said filter means between said D.-C. output terminals of said rectifier means and said control terminals of said third impedance.

References Cited in the file of this patent

UNITED STATES PATENTS

| | | |
|---|---|---|
| 2,003,428 | Cowan | June 4, 1935 |
| 2,181,579 | Curtis | Nov. 28, 1939 |
| 2,329,558 | Scherbatskoy | Sept. 14, 1943 |